United States Patent [19]
Adachi et al.

[11] Patent Number: 6,047,009
[45] Date of Patent: Apr. 4, 2000

[54] WAVELENGTH CONVERSION LASER

[75] Inventors: Takashi Adachi; Chiaki Goto, both of Kanagawa-ken, Japan

[73] Assignee: Fuji Photo Film Co., Ltd., Kanagawa-Ken, Japan

[21] Appl. No.: 09/160,345

[22] Filed: Sep. 25, 1998

[30] Foreign Application Priority Data

Sep. 26, 1997 [JP] Japan ................................. 9-261960

[51] Int. Cl.[7] ...................................................... H01S 3/10
[52] U.S. Cl. ................................. 372/21; 372/22; 372/23
[58] Field of Search ..................................... 372/21, 22, 23

[56] References Cited

FOREIGN PATENT DOCUMENTS

| 62-189783 | 8/1987 | Japan | ............................. H01S 3/109 |
| 5-5920 | 1/1993 | Japan | ................................. G02F 1/37 |

OTHER PUBLICATIONS

Mizell, 355–nm CW laser emission using a contact–bonded crystal assembly pumped with a 1 watt 808nm diode, Spie Conference on Laser Material Crystal Growth and nonlinear Materials and devices, pp. 54–56, San Jose, CA, Jan., 1999.

*Primary Examiner*—Frank G. Font
*Assistant Examiner*—Armando Rodriguez
*Attorney, Agent, or Firm*—Sughrue, Mion, Zinn, Macpeak & Seas, PLLC

[57] ABSTRACT

In a wavelength conversion laser, a laser crystal is pumped by light and the wavelength of a solid state laser beam emitted from the laser crystal is converted by a nonlinear optical crystal having a periodic domain reversal structure and disposed in a resonator. A +c-face and a –c-face of the nonlinear optical crystal are electrically connected to each other at least at portions of the faces close to the optical path of the solid state laser beam.

6 Claims, 3 Drawing Sheets

WAVELENGTH CONVERSION LASER

BACKGROUND OF THE INVENTION

1. Field of the Invention

This invention relates a solid state laser having a wavelength conversion function, and more particularly to a wavelength conversion laser in which the wavelength of a solid state laser beam is converted by a nonlinear optical element having a periodic domain reversal structure.

2. Description of the Related Art

As disclosed, for instance, in Japanese Unexamined Patent Publication No. 62(1987)-189783, there has been known a solid state laser in which a solid state laser medium doped with a rare earth metal such as neodymium is pumped by a laser beam emitted from a semiconductor laser or the like. In such a laser, it has been in wide use to dispose a wavelength convertor such as a nonlinear optical crystal in the resonator in order to convert the laser beam to its second harmonic, thereby obtaining a laser beam having a shorter wavelength.

As the wavelength convertor, there has been known one provided with a region where the spontaneous polarization (domain) of a ferroelectric crystal having a nonlinear optical effect is periodically reversed, as disclosed, for instance, in Japanese Unexamined Patent Publication No. 5(1993)-5920. In the wavelength convertor, by setting the pitch $\Lambda$ of the domain reversals to an integer multiple of the coherence length $\Lambda c$ given by formula $$\Lambda c = 2\pi/\{\beta(2\omega) - 2\beta(\omega)\},$$

wherein $\beta(2\omega)$ represents the propagation constant of the second harmonic and $\beta(\omega)$ represents the propagation constant of the fundamental wave, phase matching between the fundamental wave and the second harmonic can be obtained.

However there has been a problem in conventional wavelength conversion lasers employing a nonlinear optical crystal having a periodic domain reversal structure that they are bad in beam quality and slow in rising.

SUMMARY OF THE INVENTION

In view of the foregoing observations and description, the primary object of the present invention is to provide a wavelength conversion lasers employing a nonlinear optical element having a periodic domain reversal structure which is better in beam quality and quicker in rising.

In accordance with a first aspect of the present invention, there is provided a wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a +c-face and a -c-face of the nonlinear optical crystal are electrically connected to each other at least at portions of the faces close to the optical path of the solid state laser beam.

In accordance with a second aspect of the present invention, there is provided a wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a conductive material is mounted on a portion close to the optical path of the solid state laser beam of one of a +c-face and a -c-face of the nonlinear optical crystal with an insulating layer intervening between the portion and the conductive material, and the other of the +c-face and the -c-face of the nonlinear optical crystal is electrically connected to the conductive material at least at a portion close to the optical path of the solid state laser beam.

In accordance with a third aspect of the present invention, there is provided a wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a conductive material is mounted on a portion close to the optical path of the solid state laser beam of each of a +c-face and a -c-face of the nonlinear optical crystal with an insulating layer intervening between the portion and the conductive material, and the conductive materials are electrically connected to each other.

As will become apparent later, by electrically connecting portions close to the optical path of the solid state laser beam of the +c-face and the -c-face of the nonlinear optical crystal directly or by way of an insulating layer, beam quality is improved and rising is quickened.

DESCRIPTION OF THE PREFERRED EMBODIMENTS

Figure 1:
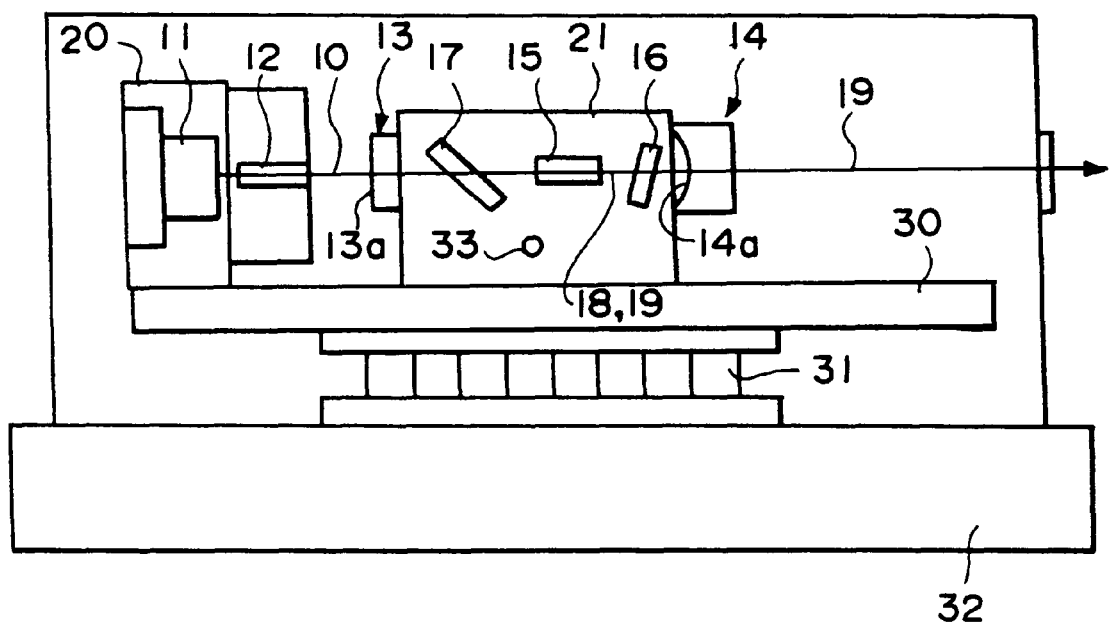
FIG. 1 is a schematic side view of a wavelength conversion laser in accordance with an embodiment of the present invention.

In FIG. 1, a laser-diode-pumped solid state laser in accordance with an embodiment of the present invention comprises a semiconductor laser 11 which produces a laser beam 10 as a pumping beam, a condenser lens 12 which condenses the laser beam 10, which is produced as divergent light, a $YVO_4$ crystal 13 which is a solid laser medium doped with neodymium (Nd) (will be referred to as "Nd:$YVO_4$ crystal 13", hereinbelow), and a resonator mirror 14 disposed forward of the Nd:$YVO_4$ crystal 13 (on the side opposite to the semiconductor laser 11).

A Brewster plate 17, a MgO:$LiNbO_3$ ($LiNbO_3$ doped with MgO) crystal 15, which is a nonlinear optical material having periodic domain reversals, and an etalon 16 are disposed between the resonator mirror 14 and the Nd:$YVO_4$ crystal 13 in this order from the Nd:$YVO_4$ crystal side. The Nd:$YVO_4$ crystal 13, the $LiNbO_3$ crystal 15, the etalon 16, the Brewster plate 17 and the resonator mirror 14 are fixedly bonded to a copper block 21 (FIG. 1) and fixed to a package base 32 by way of a base plate 30 and a Peltier element 31.

The temperature in the resonator is detected by a thermistor 33 mounted on the resonator portion and the current to the Peltier element 31 is controlled according to the temperature detected by the thermistor 33 so that the temperature in the resonator is kept at a predetermined temperature.

The semiconductor laser 11 produces a laser beam 10 having a wavelength of 809 nm. The semiconductor laser 11 is press-fitted into a holder 20. The etalon 16 comprises a quartz plate 0.3 mm thick and is inclined to the optical axis at 45" with its one light transmitting face bonded to an etalon holder of copper (not shown). The Brewster plate 17 is of a quartz plate 0.385 mm thick.

Neodymium ions in the Nd:YVO$_4$ crystal 13 are pumped by the laser beam 10 and the Nd:YVO$_4$ crystal 13 thereby produces a laser beam having a wavelength of 1064 nm. The pumping light incident side end face 13a of the Nd:YVO$_4$ crystal 13 is provided with a coating which is highly reflecting (a reflectivity of not lower than 99.9%) to light of 1064 nm and antireflecting (a transmittance of not lower than 93%) to pumping laser beam of 809 nm. The other end face of the Nd:YVO$_4$ crystal 13 is provided with a coating which well transmits light of 1064 nm.

The mirror surface 14a of the resonator mirror 14 is provided with a coating which is highly reflecting to light of 1064 nm (a reflectivity of not lower than 99.9%) and antireflecting to light of 532 nm (a transmittance of not lower than 90%).

Thus the light beam of a wavelength of 1064 nm is confined between the surfaces 13a and 14a and oscillates. The laser beam 18 of 1064 nm thus produced impinges upon the MgO:LiNbO$_3$ crystal 15 and is converted into its second harmonic 19 having a wavelength of 532 nm equal to a half of the wavelength of the laser beam 18 after subjected to type-I phase-matching by the MgO:LiNbO$_3$ crystal 15. The second harmonic 19 is mainly output from the resonator mirror 14.

In this particular embodiment, the Nd:YVO$_4$ crystal 13 is 1 mm in thickness and the MgO:LiNbO$_3$ crystal 15 is 2 mm in length. The radius of curvature of the resonator mirror 14, which is a concave mirror, is 50 mm and the distance between the end face 13a of the Nd:YVO$_4$ crystal 13 and the mirror surface 14a, which forms the resonator, is about 11 mm.

Figure 2:
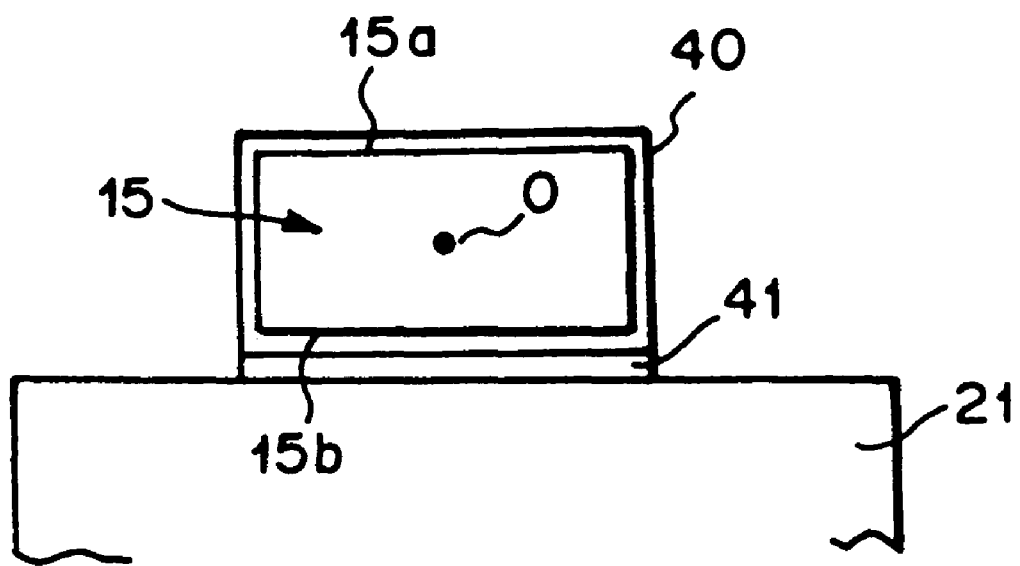
FIG. 2 is a front view showing an important part of the wavelength conversion laser.

As shown in FIG. 2, the MgO:LiNbO$_3$ crystal 15 is rectangular in cross-section and the four faces of the MgO:LiNbO$_3$ crystal 15 except the end faces through which light travels, that is, the +c-face 15a, the -c-face 15b and two side faces, are covered with a conductive metal coating 40 of Ta. The MgO:LiNbO$_3$ crystal 15 is fixed to the copper block 21 by adhesive 41.

Thus the +c-face 15a and the -c-face of the MgO:LiNbO$_3$ crystal 15 are electrically connected to each other by the metal coating 40 at their entire areas including portions of the faces close to the optical path of the solid state laser beam 18. In FIG. 2, O denotes the optical axis of the laser beam 18. With this arrangement, the second harmonic 19 output from the laser is improved in its quality and the rising of the second harmonic 19 is quickened.

Fluctuation in beam divergence angle in conventional solid state laser modules are generally about 15% pp. To the contrast, the fluctuation in solid state laser modules in accordance with the embodiment described above can be suppressed to 3% pp. The rising time is about one hour in conventional solid state laser modules and is shortened to five minutes in solid state laser modules in accordance with the embodiment described above.

The +c-face and the -c-face of the MgO:LiNbO$_3$ crystal 15 may be electrically connected to each other, in place of use of the metal coating 40, by carrying out electrical resistance reduction processing such as proton exchange on the area over which the metal coating 40 is applied.

Figure 3:
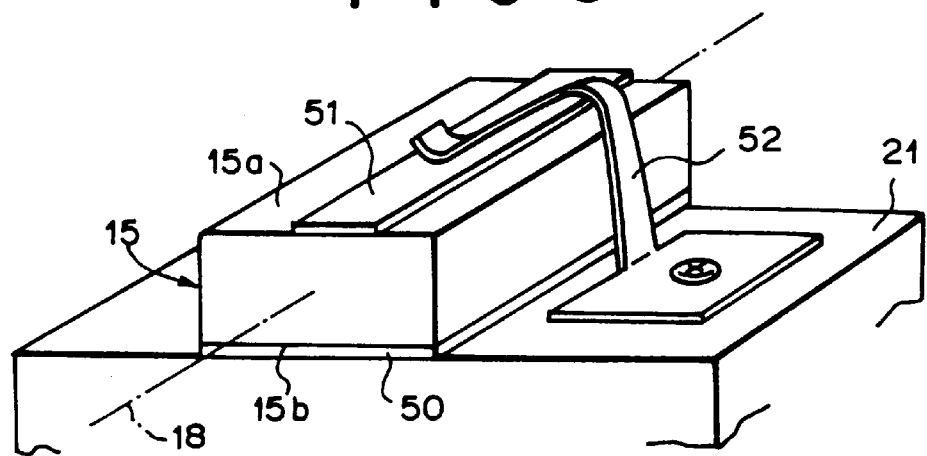
FIG. 3 is a perspective view of a wavelength conversion laser accordance with another embodiment of the present invention.
Figure 4:
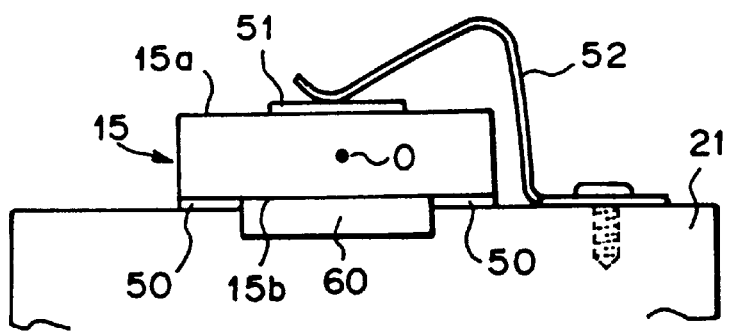
FIG. 4 is a front view showing an important part of a wavelength conversion laser in accordance with still another embodiment of the present invention.
Figure 5:
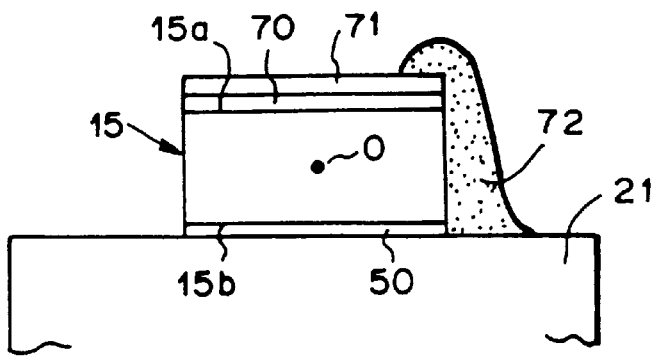
FIG. 5 is a front view showing an important part of a wavelength conversion laser in accordance with still another embodiment of the present invention.

Other embodiments of the present invention will be described with reference to FIG. 3 to 5, hereinbelow. In FIGS. 3 to 5, the elements analogous to those shown in FIG. 2 are given the same reference numerals and will not be described here.

The embodiment shown in FIG. 3 is substantially the same as that shown in FIGS. 1 and 2 except the following point.

That is, in the embodiment shown in FIG. 3, the -c-face 15b of the MgO:LiNbO$_3$ crystal 15 is bonded to the copper block 21 by nonconductive adhesive 50. The +c-face 15a of the MgO:LiNbO$_3$ crystal 15 is provided with a Ta coating 51 in a portion along the optical path of the laser beam 18. A resilient member 52 of, for instance, copper is fixed to the copper block 21 at its base end and is resiliently pressed against the Ta coating 51.

That is, in this embodiment, the entire area of the -c-face 15b of the MgO:LiNbO$_3$ crystal 15 including the portion along the optical path of the laser beam 18 is bonded to the copper block 21 by way of the nonconductive adhesive 50 while the portion of the +c-face along the optical path of the laser beam 18 is electrically connected to the Ta coating 51 and the resilient member 52.

Also in solid state laser modules in accordance with this embodiment, the fluctuation can be suppressed to 3% pp and the rising time is shortened to five minutes.

In place of use of the metal coating 51, electrical resistance reduction processing such as proton exchange may be carried out on the area over which the metal coating 51 is applied.

Further, in place of the nonconductive adhesive 50, a gas layer, e.g., an air layer, 60 may be formed in a portion along the optical path of the laser beam 18 as an insulating layer as shown in FIG. 4.

Further in the arrangements shown in FIGS. 3 and 4, at least a portion of the -c-face 15b near the optical path of the laser beam 18 may be provided with a metal coating or may be subjected to electrical resistance reduction processing such as proton exchange.

Further the -c-face 15b of the MgO:LiNbO$_3$ crystal 15 may be directly fixed to the copper block 21 without insulating layer intervening therebetween and the +c-face 15a and the -c-face 15b may be electrically connected to each other by way of the metal coating 51, the resilient member 52 and the copper block 21.

In the embodiment shown in FIG. 5, the -c-face 15b of the MgO:LiNbO$_3$ crystal 15 is bonded to the copper block 21 by nonconductive adhesive 50 and a copper plate 71 is bonded to the +c-face 15a by nonconductive adhesive 70. Then the copper plate 71 and the copper block 21 are electrically connected by conductive adhesive 72.

Also in solid state laser modules in accordance with this embodiment, the fluctuation can be suppressed to 3% pp and the rising time is shortened to five minutes.

In the embodiment shown in FIG. 5, the same result can be obtained even if at least one of the nonconductive adhesives 50 and 70 is removed. Further at least a portion of the +c-face 15a and/or the -c-face 15b near the optical path of the laser beam 18 may be provided with a metal coating or may be subjected to electrical resistance reduction processing such as proton exchange.

What is claimed is:

1. A wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a +c-face and a −c-face of the nonlinear optical crystal are electrically connected to each other at least at portions of the faces close to the optical path of the solid state laser beam.

2. A wavelength conversion laser as defined in claim 1 in which the nonlinear optical crystal having a periodic domain reversal structure is a $MgO:LiNbO_3$ crystal.

3. A wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a conductive material is mounted on a portion close to the optical path of the solid state laser beam of one of a +c-face and a −c-face of the nonlinear optical crystal with an insulating layer intervening between the portion and the conductive material, and the other of the +c-face and the −c-face of the nonlinear optical crystal is electrically connected to the conductive material at least at a portion close to the optical path of the solid state laser beam.

4. A wavelength conversion laser as defined in claim 3 in which the nonlinear optical crystal having a periodic domain reversal structure is a $MgO:LiNbO_3$ crystal.

5. A wavelength conversion laser in which a laser crystal is pumped by light and the wavelength of a solid state laser beam emitted from the laser crystal is converted by a nonlinear optical crystal having a periodic domain reversal structure and disposed in a resonator, wherein the improvement comprises that a conductive material is mounted on a portion close to the optical path of the solid state laser beam of each of a +c-face and a −c-face of the nonlinear optical crystal with an insulating layer intervening between the portion and the conductive material, and the conductive materials are electrically connected to each other.

6. A wavelength conversion laser as defined in claim 5 in which the nonlinear optical crystal having a periodic domain reversal structure is a $MgO:LiNbO_3$ crystal.

* * * * *